April 16, 1957 A. L. QUINLAN 2,789,202

WELDING APPARATUS

Filed Dec. 30, 1953 4 Sheets-Sheet 1

INVENTOR
A. L. QUINLAN
BY C. B. Hamilton
ATTORNEY

April 16, 1957 A. L. QUINLAN 2,789,202

WELDING APPARATUS

Filed Dec. 30, 1953 4 Sheets-Sheet 2

INVENTOR
A. L. QUINLAN
BY C. B. Hamilton
ATTORNEY

INVENTOR
A. L. QUINLAN
BY C. B. Hamilton
ATTORNEY

WELDING APPARATUS
Filed Dec. 30, 1953
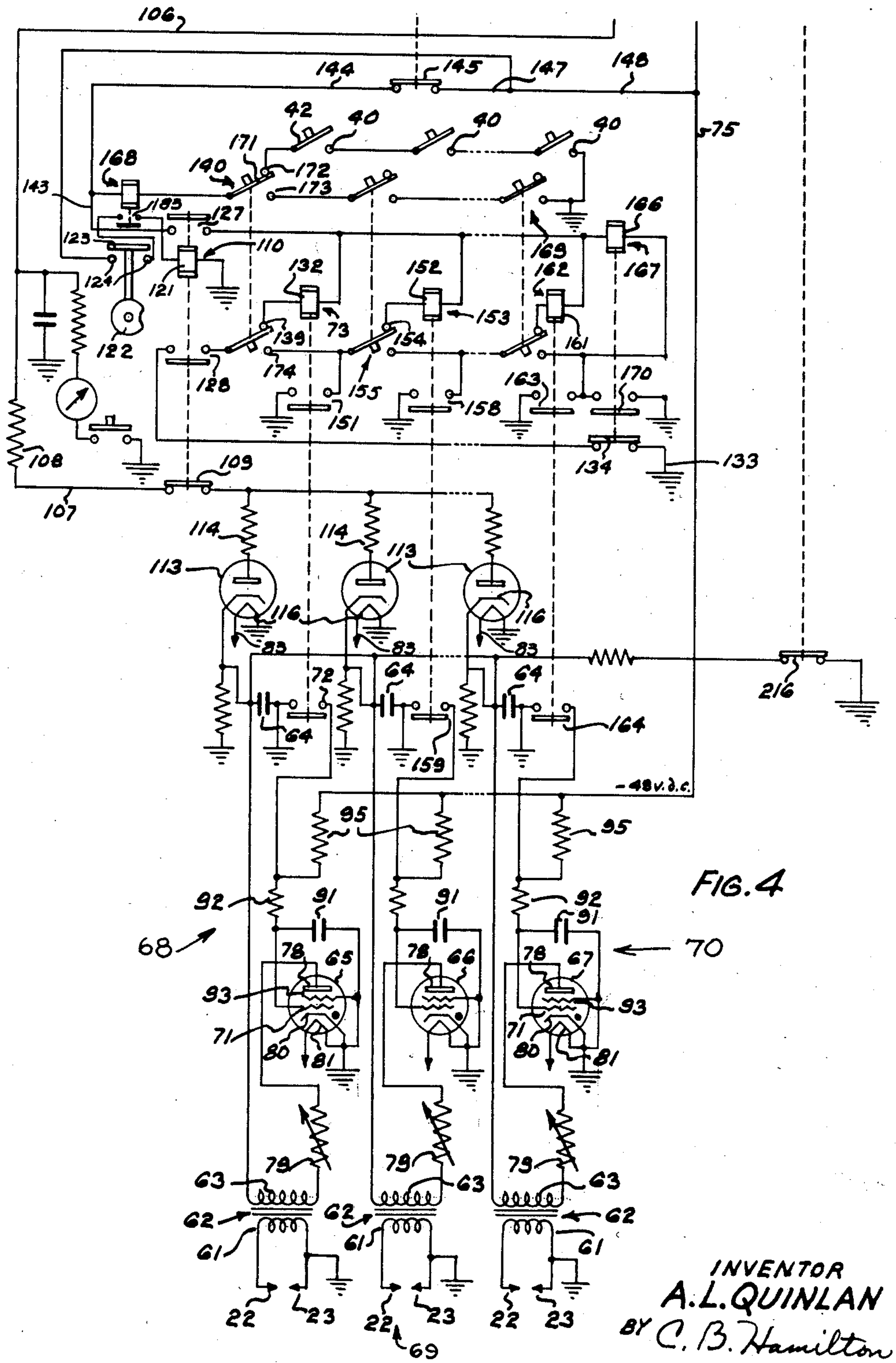
INVENTOR
A. L. QUINLAN
BY C. B. Hamilton
ATTORNEY United States Patent Office 2,789,202

Patented Apr. 16, 1957

2,789,202

WELDING APPARATUS

Amos L. Quinlan, La Grange Park, Ill., assignor to Western Electric Company, Incorporated, New York, N. Y., a corporation of New York Application December 30, 1953, Serial No. 401,137

3 Claims. (Cl. 219—78)

This invention relates to welding apparatus, and more particularly to welding apparatus for welding a plurality of contacts to wires of a relay comb.

In the manufacture of wire spring relays having contacts on the ends of wire springs of each comb, the contacts normally are welded to the wires. It has been proposed to simultaneously weld all the contacts to all the wires of a comb. However, individual pairs of welding electrodes must be used, and, due to close spacing of the wires, the welding electrodes must be spaced near to one another. When the pairs of electrodes are fired simultaneously, unbalanced inductive voltages are set up in the several pairs of electrodes to make uniform welding of the several contacts very difficult.

An object of the invention is to provide new and improved welding apparatus.

A further object of the invention is to provide new and improved apparatus for welding contacts to wires of a wire spring relay.

Another object of the invention is to provide apparatus for welding contacts to wires of wire spring relay combs automatically one after another.

A further object of the invention is to provide apparatus for welding uniformly a plurality of contacts to a plurality of closely spaced wires.

A welding apparatus illustrating certain features of the invention may include a plurality of closely spaced individual pairs of electrodes, one pair for each wire of a wire spring relay comb having a plurality of wires to have a contact welded to each. A plurality of capacitors individual to each pair of electrodes are provided for supplying welding current individually to the pairs of electrodes, and triggering means individual to each pair of welding electrodes are provided for discharging the capacitors to their respective pairs of electrodes. Means are provided for discharging the capacitors through the pairs of electrodes at different times to reduce the inductive effect of adjacent parts of the individual welding circuits.

A complete understanding of the invention may be obtained from the following detailed description of a welding apparatus forming a specific embodiment thereof, when read in conjunction with the appended drawings, in which:

Fig. 4 is a schematic view of the remainder of the control circuit.

Figure 2:
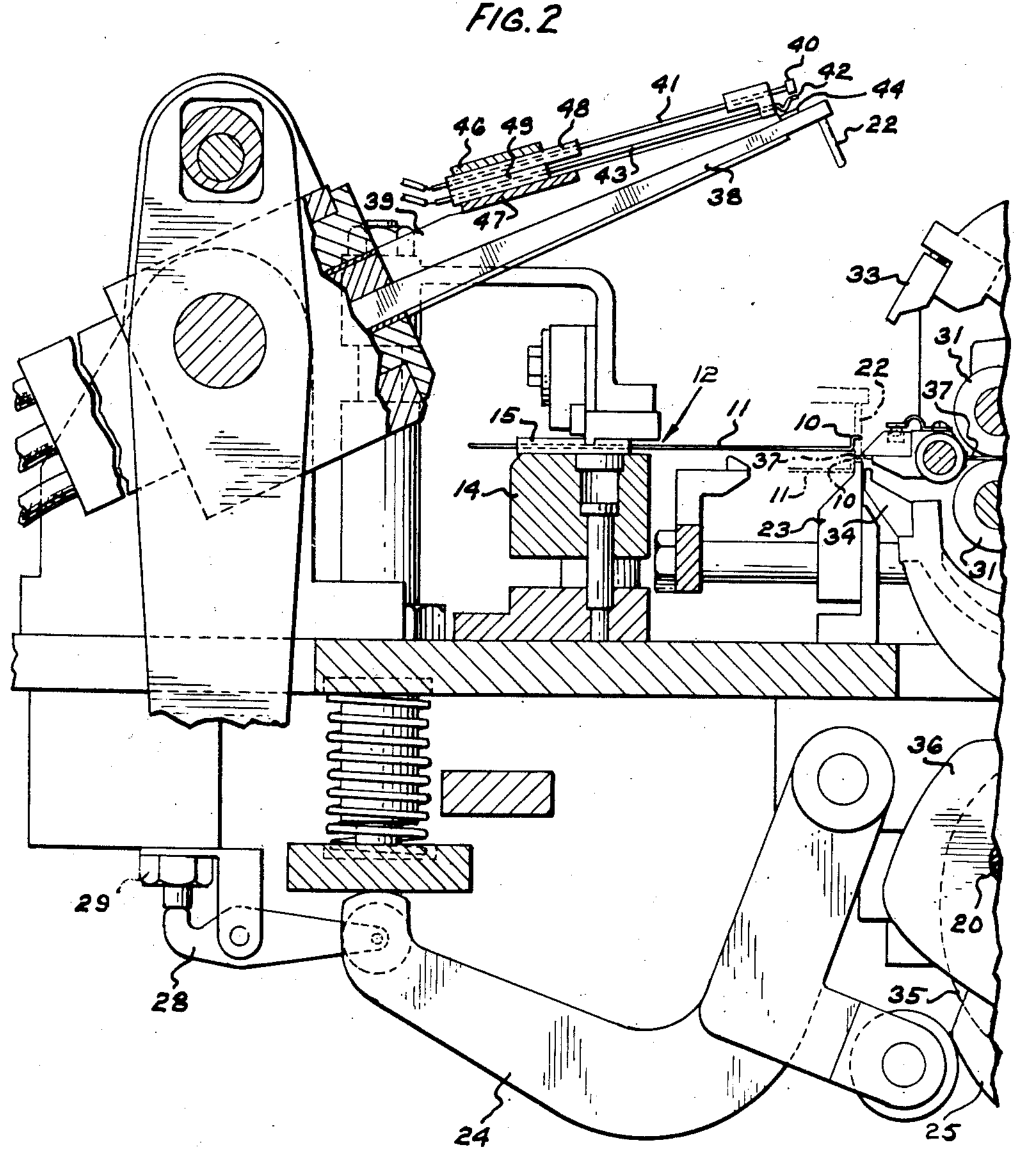
Fig. 2 is a vertical section of the apparatus shown in Fig. 1.

Referring now in detail to the drawings, there is shown therein a welding machine for welding contacts 10 to closely spaced wires 11 of a wire spring relay comb 12. The apparatus includes a transfer bar 14 holding a block 15 of the comb rigidly to properly position the comb in the apparatus. The transfer bar 14 holds a plurality of the combs at spaced positions therealong, and is actuated by a feed mechanism 18 driven by means of a cam shaft 20 to position the combs 12 one after another in a welding position between upper electrodes 22 and a common lower electrode 23. The cam shaft 20 closes and opens the electrodes 22 relative to the electrode 23 through a linkage 24 and a cam 25. Whenever the electrodes 22 are swung in a clockwise direction, as viewed in Fig. 2, to their welding positions, levers 28 actuate a limit switch 29 if the comb is improperly positioned. Ends of contact tapes 37 are fed over upwardly bent ends of the wires 11 by feed rolls 31, also driven by the cam shaft 20. After each weld is completed as described hereinbelow, shears 33 and 34 are actuated by cams 35 and 36, respectively, pinned to the cam shaft 20 to shear the contacts 10 from the tapes 37 of contact material. The mechanical features described hereinabove are disclosed and claimed in copending application Serial No. 386,742, filed October 19, 1953, for "Welding Apparatus," by H. A. Myers.

Each of the electrodes 22 is supported by one of the flexible cantilever arms 38, which are located between rigid arms 39, and the arms 38 and 39 are pivoted as a unit between a retracted position and a welding position in which the electrodes 22 engage the tapes 37 positioned on the upwardly bent ends of the wires 11. While in the welding position with tapes and a wire between one of the electrodes 22 and the electrode 23, the flexible arm 38 holding that electrode 22 is flexed substantially upwardly while the rigid arms 39 have overtravelled beyond the welding position of that electrode 22 to move one of a plurality of contacts 40 of a comb 41 forming part of the apparatus down against one of a plurality of wire spring contacts 42 of a comb 43 held against an insulating block 44 on the flexible arm 38. If there is no contact tape 37 engaged by one of the electrodes 22 from a misfeed or other reason, or if there is no wire 11 below the electrode 22 for some reason, the arm 38 is not flexed sufficiently to hold the contact 42 in a position to be engaged by its aligned contact 40. The combs 41 and 43 are clamped by plates 46 and 47 rigidly to the rigid arms 39 through insulating blocks 48 and 49 of the combs 41 and 43. The contacts 40 and 42 form individual switches, all of which must be closed in order for welding to occur except where no welding is intended for a particular electrode 22, as is brought out hereinafter.

Figure 3:
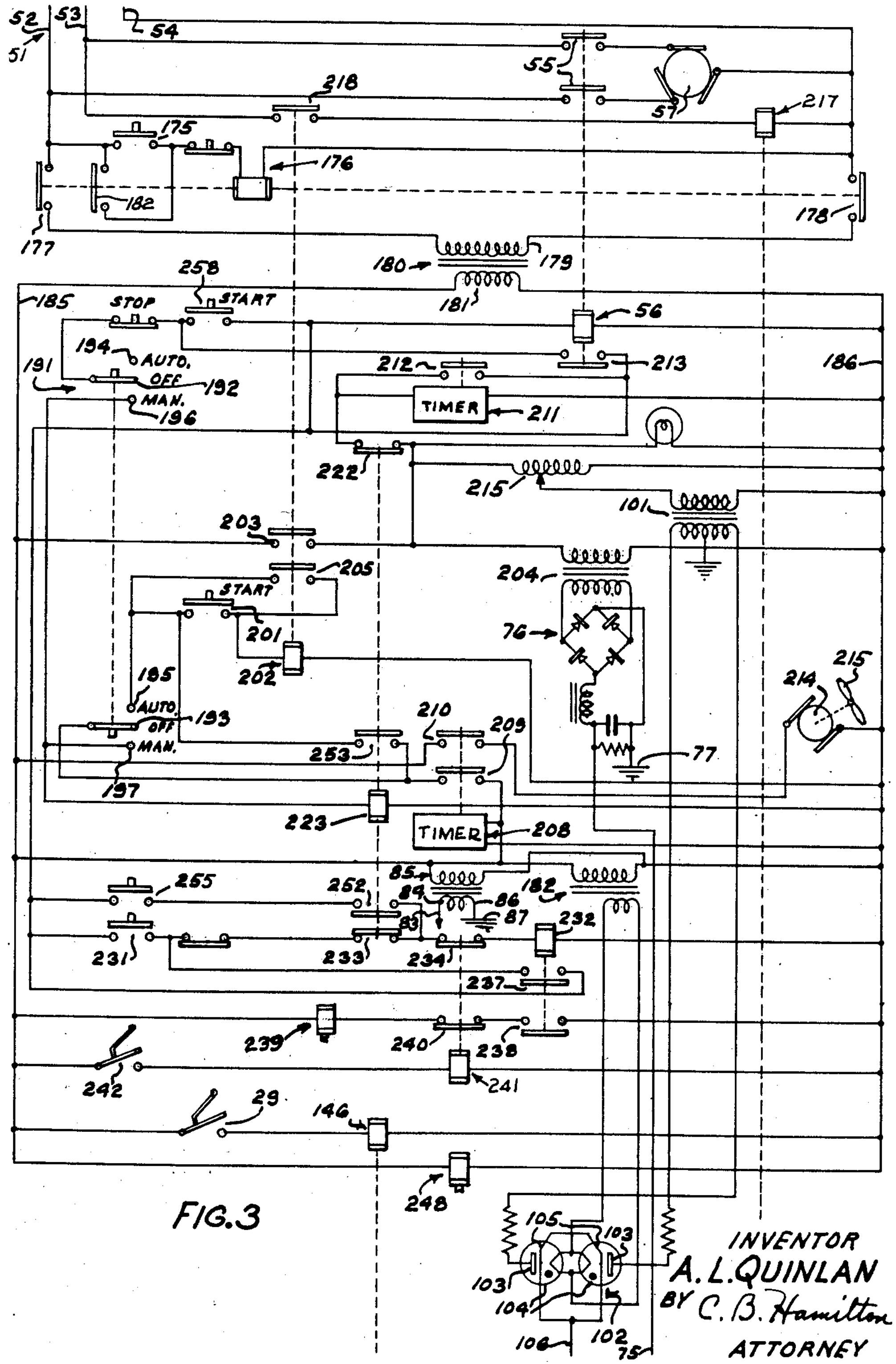
Fig. 3 is a schematic view of a portion of a control circuit for the apparatus shown in Fig. 1.

A control circuit (Figs. 3 and 4) includes a three phase power line 51, having conductors 52, 53 and 54. The conductors 52 and 53 are connected by normally open contacts 55 of a relay 56 to a motor 57 operable continuously when the contacts 55 are closed to repeatedly revolve the shaft 20 to drive the welding machine described hereinabove. The welding electrodes 22 and 23 are connected to secondary windings 61 of transformers 62 having primary windings 63 in which current is induced when capacitors 64 are discharged by trigger-type, gas-filled tubes 65, 66 and 67, which may be thyratrons or other similar type of trigger tubes forming portions of welding circuits 68, 69 and 70, respectively. While only the three welding circuits are shown, it is to be understood that there is one welding circuit for each electrode 22, the circuits not being shown being identical with those shown and being connected between the circuits 69 and 70.

When such a discharge of one of the capacitors 64 occurs, high voltage is impressed across the primary winding 63 and induces a low voltage, high current potential in the secondary winding 61. Each of the trigger tubes 65, 66 and 67 is fired by a control electrode 71 when normally open contacts 72 of a relay 73 are closed to remove a negative bias on the control electrode 71 from a negative conductor 75 connected to a D. C. power-supplying network 76 having a positive conductor 77 thereof connected to ground.

Plates 78 of the tubes 65, 66 and 67 are connected through adjustable resistors 79 to one side of each of the primary windings 63 while cathodes 80 of the tubes 65, 66 and 67 are grounded as is one side of each of heating filaments 81. The other side of each heating filament 81 is connected to a conductor 83 leading from a secondary winding 84 of a transformer 85, a conductor 86 connected to the secondary winding 84 being grounded at 87. Capacitors 91 connect the control electrodes 71 and small resistors 92 to ground, and screen grids 93 of the tubes 65, 66 and 67 also are connected to ground. The negative D. C. conductor 75 is connected to the control electrodes 71 through resistors 95 and the resistors 92.

A transformer 101 serves to supply power to a full wave rectifier 102 through plates 103 of high current capacity, gas-filled tubes 104 forming the rectifier. Cathodes 105 of the tubes 104 are connected by conductors 106 and 107 and a resistor 108 to normally closed contacts 109 of a relay 110. The full-wave rectifier serves, when the contacts 109 are closed, to supply power to capacitor-charging diodes 113 through resistors 114. Heating filaments 116 of the diodes 113 are connected at one side to ground and at the other side to the conductor 83 connected to the filament power supply 85.

A winding 121 of the relay 110 is deenergized except for a portion of the time that a cam 122 driven by the shaft 20 (Fig. 2) permits contacts 123 to close on contacts 124, which occurs just before the welding operation on each comb and lasts until after all the contacts for each comb are welded thereto. When the cam 122 permits the contacts 123 and 124 to close, the relay winding 121 is energized to close contacts 127 and 128 and open contacts 109, the contacts 109 being opened to prevent charging of the capacitors 64 while they are being discharged in the welding operation so that a precise measured quantity of current is delivered for each weld.

Upon actuation of the relay 110 to close the contacts 127 and 128, a circuit to a winding 132 of the relay 73 is closed from ground at 133 through contacts 134, the contacts 128, contacts 139 of a manually operable toggle switch 140, the relay winding 132, the contacts 127, conductors 143 and 144, normally closed contacts 145 of a relay 146 and conductors 147 and 148 connected to the negative conductor 75. This actuates the relay 73 to close the contacts 72 to discharge the tube 65 to the electrodes 22 and 23 coupled thereto until the capacitor 64 connected thereto fully discharges. As the relay 73 is energized, it also closes contacts 151 to energize a winding 152 of a relay 153 through the contacts 127 and contacts 154 of a manually operable toggle switch 155. When the relay 153 is energized, it closes contacts 158 and 159. The contacts 159 trigger the tube 66 to cause its associated electrodes 22 and 23 in the welding circuit 69 to weld from the discharge of the capacitor 64 connected to the tube 66. Closing of the contacts 158 energizes the next relay winding (not shown) to fire the next welding circuit and so on until a relay winding 161 of a relay 162 in the last welding circuit 70 is energized to close contacts 163 and 164. Closing of the contacts 164 fires the gas-filled tube 67 to discharge the capacitor 64 connected thereto to cause the righthand electrodes 22 and 23 to weld. Closing of the contacts 163 connects a winding 166 of a relay 167 to ground to actuate the relay 167 from the negative conductor 75, and the relay 167 closes contacts 170 and opens the contacts 134. Opening of the contacts 134 drops out the relay 73, and closure of the contacts 170 locks in the relay 167 until the cam 122 reopens the contacts 123 to drop out the relay 110.

Just after the relay 167 is locked in, the welds having been completed on all the wires 11 of the comb 12 in the welding position, the cam 122 opens the contacts 123 to drop out the relay 110, causing the contacts 127 to drop out the relays 73, 153, 162 and 167 to reset the cascading relay circuit. When the relay 110 is deenergized, the contacts 109 close to start charging the capacitors 64 for the next weld.

Each pair of the contacts 40 and 42 (Fig. 4) is associated with one of the welding circuits, and is connected in series with a relay 168 and the other pairs of contacts 40 and 42. A contactor 171 of the toggle switch 140 engages a contact 172 when the contacts 139 are closed to place the contacts 40 and 42 associated with the welding circuit 68 in series with the relay 168 when the relay 73 is intended to operate the welding circuit 68. When it is not intended to use the welding circuit 68, the switch 140 is moved by an operator to move the contactor 171 into engagement with a contact 173 to shunt out the left-hand contacts 40 and 42. This also moves the movable contact 139 into engagement with a contact 174 to shunt out the relay 73. This prevents operation of the relay 73 and causes the relay 153 to be the first to operate. Similarly, each of switches 155 and 169 and switches (not shown) between these switches may be actuated to shunt out one of the relays 153 and 162 and corresponding relays (not shown) associated with the welding circuits between the circuits 69 and 70 and also shunt out the contacts 40 and 42 associated therewith if it is not desired to operate the welding circuit operable by that relay. The relay 168 has normally open contacts 183 in series with the contactor 123 and contacts 124, so that, before the relay 110 can be energized to start any welding, each contact tape 37 must be in proper position and properly engaged by each welding contact 22 intended to be operated to energize the relay 168. That is, each pair of contacts 40 and 42 which has not been shunted out of the circuit to the relay 168 must be closed by a properly positioned contact tape 37 and wire 11 before the relay 168 is operated.

In starting the machine, a normally open momentary switch 175 (Fig. 3) is closed by an operator to actuate a relay 176 to close contacts 177 and 178 in the conductors 52 and 54 of the power line 51 to energize a primary winding 179 of a transformer 180 having a secondary winding 181. The relay 176 also closes holding contacts 182. The secondary winding 181 applies a voltage to control power lines 185 and 186 to energize transformers 85 and 182 to heat the filaments of the tubes 65, 66, 67, 113 and 104, (Fig. 4). A toggle switch 191 (Fig. 3) is movable between an off position, an automatic position in which contactors 192 and 193 engage contacts 194 and 195, respectively, and a manual position in which the contactors 192 and 193 engage contacts 196 and 197. Assuming the switch 191 to be in its automatic position, energization of the transformer 180 also having started a timer 208 of a well-known type, the timer 208 keeps contacts 209 and 210 open for a time sufficient to prevent actuation of a relay 202 through a manually operable momentary switch 201 and starting of a cooling motor 214 until the tubes 65, 66, 67, 103 and 113 have warmed up. The timer 208, after the warmup period, closes the contacts 209 and holding contacts 210 and keeps them closed. The contacts 210 control the motor 214 for driving a fan 215 for cooling the tubes 65, 66, 67, 103 and 113.

The switch 201 then is closed to actuate the relay 202 to close contacts 203 to a transformer 204 of the power supply 76 and close holding contacts 205 shunting the switch 201. Closing of the contacts 203 also actuates the high voltage transformer 101 to charge the capacitors 64, shorting contacts 216 of a relay 217 having been opened by closing of contacts 218 of the relay 202. Closing of the contacts 203, also actuates, through contacts 222 of a relay 223, a timer 211 of a well-known type, which holds open contacts 212 for a few seconds until the capacitors 64 are fully charged and then closes the contacts 212 to actuate the relay 56. The relay 56 closes contacts 55 to the motor 57 and closes holding contacts 213.

Figure 1:
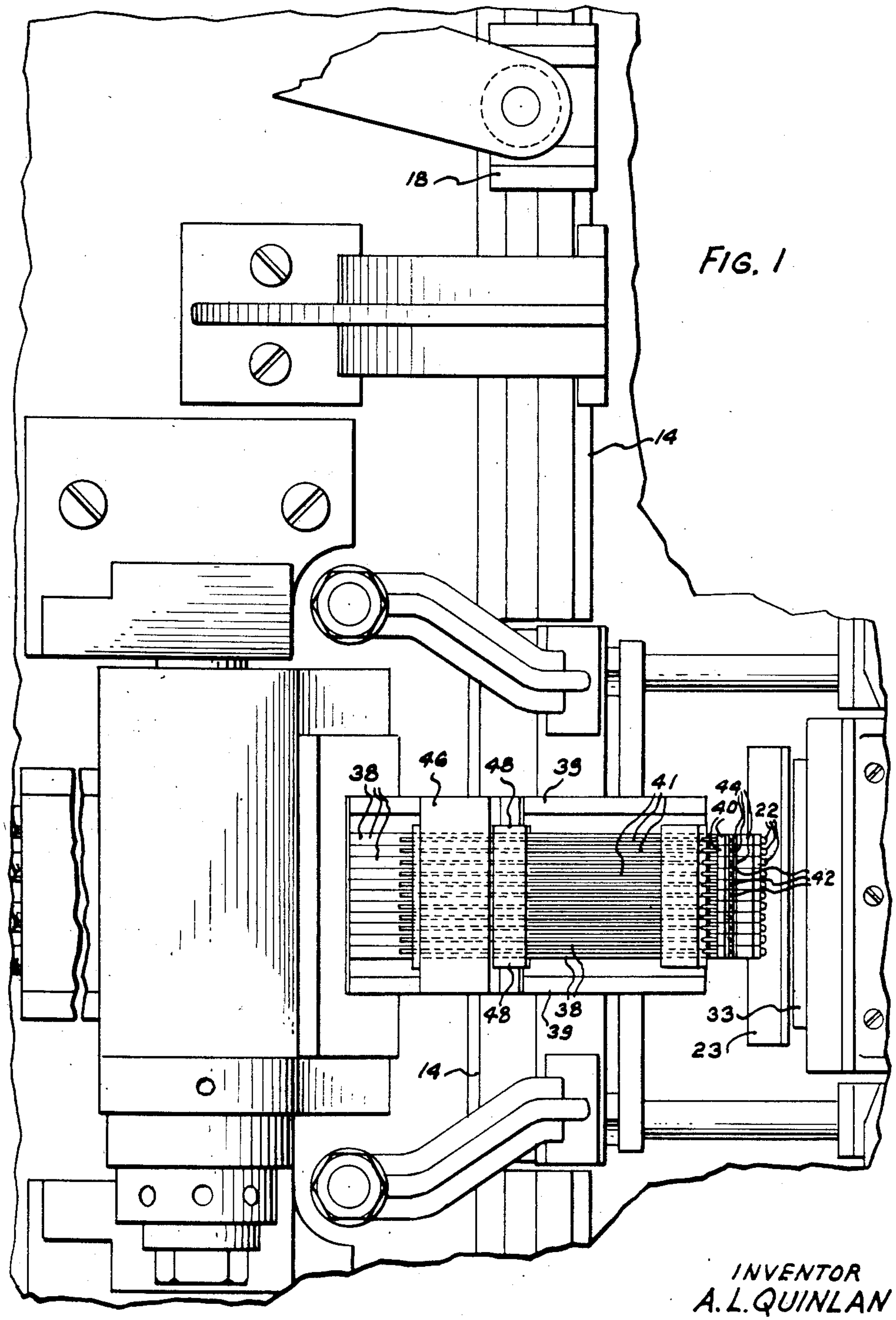
Fig. 1 is a top plan view of an apparatus forming a portion of an apparatus forming one embodiment of the invention.

A manually operable momentary switch 231 is closed by an operator to actuate a relay 232 through normally closed contacts 233 and 234 of the relay 223 and a relay 241, respectively. The relay 232 closes holding contacts 237 to lock itself in, and also closes contacts 238 to actuate a clutch solenoid 239 through contacts 240 of the relay 241, and the clutch starts the continuously operable drive of the welding machine. The relay 241 is controlled by a limit switch 242, which is closed by improper feeding of the tapes 37 (Fig. 1) to drop out the clutch solenoid 239 and stop the apparatus. The limit switch 29 is closable by any improperly positioned comb as the arms 38 are closed to actuate the relay 146 to open the contacts 145 to prevent welding operations on the comb so positioned.

For manual operation, the contactors 192 and 193 of the switch 191 are moved from their automatic positions to their manual positions, and the relay 223 is actuated through a circuit including the contacts 209, the contactor 193 and the contacts 197 after the timer 208 has timed out. The relay 223 breaks contacts 222 to lock out the timer 211, breaks the contacts 233 to shunt out the switch 231 to prevent locking in the relay 232, closes contacts 252 to set up a circuit to the relay 232 through a manually operable, momentary switch 255, and closes contacts 253 to set up a circuit to the relay 202 through the switch 201. A manually operable, momentary switch 258 is closed to actuate the relay 56, which starts the motor 57 and runs it until the switch 258 is released.

The contacts 218 of the relay 202 actuate when closed the relay 217 to open the normally closed contacts 216, which shunt the capacitors 64 when the relay 202 is not actuated. Thus, whenever the charging transformer 101 is deenergized, the capacitors 64 are discharged.

*Operation*

Power is applied to the circuit by closing the switch 175 to actuate the relay 176, which holds itself in and applies power to the transformer 180. The filament transformers 85 and 182 then are energized to begin warming up the tubes 65, 66, 67, 103 and 113, and the timer 208 is started. After a sufficient warmup period, the timer 208 closes the contacts 209 to start the motor 214 to drive the tube-cooling fan 215, and closes the contacts 210 to supply power to the contactor 193.

To operate automatically, the switch 191 is placed in its automatic position, and the high voltage may be turned on after the warmup timer 208 has timed out to close the contacts 209 by pressing the start switch 201. This actuates the relay 202 to lock itself in, start the charging timer 211, actuate the relay 217, and energize the transformers 101 and 204 to apply power to the charging rectifier 102 and bias the control electrodes 71. While the shaft 20 drives the transfer bar 14 to locate a comb in the welding position, causes the contact tape feeder to feed the contact tapes 37 over the wires 11 and closes the electrodes 22 and 23 on the wires and the tapes, the cam 122 keeps the contacts 123 open so that the contacts 109 are closed and the capacitors 64 are charged fully through the tubes 113. Then the cam 122 causes the contacts 123 to close to actuate the relay 110 to open the contacts 109 and close the contacts 128, which causes sequential actuation of the relays 73, 153, 162 and 167. The relays 73 and 153, the similarly connected relays (not shown) connected between the relays 153 and 162, and the relay 162 sequentially fire the tubes 65 and 66, the similar tubes associated with the relays between the relays 153 and 162 and the tube 67 to weld each of the tapes 37 to the wires 11 of the comb at a different time, each welding cycle being substantially completed before the next relay starts the next welding circuit. That is, the relays 153, 162 and 167 and the intermediate relays between the relays 153 and 162 are sufficiently slow in pulling up that the capacitor 64 of the preceding welding circuit has fully discharged before the relay starts to discharge the capacitor 64 in the welding circuit controlled by the relay pulling up. Thus, inductive fields created in the next welding circuit to be operated by the welding circuit being operated are spent by the time the next welding circuit is operated.

After the relay 167 is actuated, it drops out the relays 73, 153 and 162 and the intermediate relays to stop discharge of the tubes 65, 66 and 67 and the intermediate tubes and shortly thereafter the cam 122 opens the contacts 123 to drop out the relay 110 to start charging the capacitors 64 for welding operations on the next comb. The shaft 20 then actuates the shears 33 and 34 to sever the welded portions of the contact tapes 37, retract the shears, retract the electrodes 22, and move the transfer bar 14 to take out the welded comb and move the next comb into the welding position, and the operation described hereinabove is repeated automatically.

For manual operation, the switch 191 is moved to the manual position, the switch 175 is closed to actuate the relay 176, the filament transformers 85 and 182, and the timer 208, which times out to close the contacts 209 and 210. The switch 258 then may be closed to actuate the relay 56 and start the motor 57 before the timer 211 times out, and, then the switch 253 is closed and the clutch solenoid 232 is actuated and locks in. The machine then operates as long as the switch 258 is held closed.

The above-described apparatus rapidly welds a large number of contacts to each comb, and does so without overlapping the welding discharge periods of any two contacts so that induction distortions from the high voltage welding circuits are avoided. Each contact and wire have the same welding condition as all other contacts and wires. The same quantity of electricity is used for each pair of welding electrodes, and the discharge of each of the capacitors 64 is precisely timed.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A welding apparatus, which comprises a plurality of flexible arms, a plurality of welding electrodes mounted on the flexible arms, electrode means for cooperating with the electrodes to oppositely engage a plurality of parts to be welded together, means for creating relative movement between the electrodes and the electrode means to close the electrodes and the electrode means on the parts positioned therebetween, a pair of wire spring combs each having a plurality of contacts, means mounting the combs and the arms in such positions that each of the contacts of one of the combs is pushed by one of the arms into engagement with one of the contacts of the other comb when the electrode carried by that arm and the electrode means engage parts to be welded, means for applying a welding voltage to the electrodes and the electrode means, and actuating means disabled if any pairs of contacts of the combs are not closed for actuating the voltage-applying means.

2. A welding apparatus, which comprises a plurality of pairs of electrodes, means for moving simultaneously the pairs of electrodes between open and closed positions, transfer means for carrying multipart articles one after another to a position between the pairs of electrodes, drive means for synchronously actuating the transfer means to move one of the articles to said position between the pairs of electrodes, and actuating the moving means to close the electrodes on the article and parts placed on the articles, hold the electrodes closed for a period of time and open the electrodes, a plurality of welding circuits each coupled to one of the pairs of electrodes, each of said circuits including a capacitor and a trigger-type tube in series with the capacitor, a power supply, a plurality of rectifying means individual to each welding circuit connecting the power supply to the capacitors, switching means connected in cascade for firing the trigger-type tubes one after another, and means operable by the drive means for actuating the switching means.

3. A welding apparatus, which comprises a plurality of pairs of electrodes, means for moving simultaneously the pairs of electrodes between open and closed positions, transfer means for carrying multipart articles one after another to a position between the pairs of electrodes, drive means for synchronously actuating the transfer means to move one of the articles to said position between the pairs of electrodes, and actuating the moving means to close the electrodes on the article and parts placed on the articles, hold the electrodes closed for a period of time and open the electrodes, a plurality of welding circuits each coupled to one of the pairs of electrodes, each of said circuits including a capacitor and a trigger-type tube in series with the capacitor, a power supply, a plurality of rectifying means individual to each welding circuit connecting the power supply to the capacitors, relay means connected in cascade for firing the trigger-type tubes one after another, means operable by the drive means for actuating the relay means, a plurality of feeler means each operable by a mispositioned part to be welded for preventing operation of the relay means, and selective switching means for rendering selected ones of the relay means and feeler means inoperative.

References Cited in the file of this patent

UNITED STATES PATENTS

| | | |
|---|---|---|
| 1,269,617 | Ledwinka | June 18, 1918 |
| 1,554,385 | Still | Sept. 22, 1925 |
| 2,287,945 | Purat | June 30, 1942 |
| 2,296,286 | Leathers | Sept. 22, 1942 |
| 2,338,002 | Mero | Dec. 28, 1943 |
| 2,343,686 | Martindell | Mar. 7, 1944 |
| 2,394,535 | Dawson | Feb. 12, 1946 |
| 2,452,009 | Woodward | Oct. 19, 1948 |
| 2,454,338 | Pityo et al. | Nov. 23, 1948 |
| 2,467,321 | Leathers | Apr. 12, 1949 |